United States Patent
Krishnan et al.

(10) Patent No.: US 8,661,171 B1
(45) Date of Patent: Feb. 25, 2014

(54) HOST-SLAVE INTERFACE FOR WIRELESS COMMUNICATION CIRCUIT

(75) Inventors: Shri Krishnan, Sunnyvale, CA (US);
Aman Singla, Saratoga, CA (US);
Manoj Unnikrishnan, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 866 days.

(21) Appl. No.: 12/795,261

(22) Filed: Jun. 7, 2010

(51) Int. Cl.
*G06F 13/00* (2006.01)

(52) U.S. Cl.
USPC .......................................... 710/100; 455/507

(58) Field of Classification Search
USPC ............................ 710/100, 110; 455/500, 507
See application file for complete search history.

(56) References Cited

U.S. PATENT DOCUMENTS

| | | | | |
|---|---|---|---|---|
| 7,533,202 B2* | 5/2009 | Newman | ......................... | 710/64 |
| 8,230,146 B2* | 7/2012 | Wiesgickl | ..................... | 710/110 |
| 2011/0306374 A1* | 12/2011 | Hirai | ............................. | 455/507 |
| 2012/0239773 A1* | 9/2012 | Blustein et al. | ............... | 709/208 |
| 2012/0323394 A1* | 12/2012 | Gandhi | ......................... | 700/297 |
| 2013/0107770 A1* | 5/2013 | Marsden et al. | ............. | 370/310 |

* cited by examiner

*Primary Examiner* — Clifford Knoll
(74) *Attorney, Agent, or Firm* — Bever, Hoffman & Harms, LLP

(57) ABSTRACT

Embodiments of the present invention provide a high throughput, low pin count, low power, and small area solution for the interface between a host device and a wireless communication circuit. In one embodiment of the invention, a system for wireless communication using a host-slave interface is disclosed. The system is comprised of a host device having a slave interface, and a wireless communication circuit having a master interface coupled to the host device's slave interface. The wireless communication circuit transfers data between a wireless network and the host device. Using such a system, a wireless communication system with a host-slave interface is produced.

20 Claims, 6 Drawing Sheets

HOST-SLAVE INTERFACE FOR WIRELESS COMMUNICATION CIRCUIT

FIELD OF THE INVENTION

The invention relates generally to wireless local area network (WLAN) integrated circuits (ICs), and more specifically to interfaces on WLAN communication ICs.

BACKGROUND OF THE INVENTION

With the explosive popularity of wireless devices, such as laptops, netbooks, cell phones, and other mobile and handheld communications devices capable of accessing the Internet, wireless data communications is becoming an integral, indispensible feature in portable consumer electronics. The trend towards ever increasing wireless usage has been aided in large part by the availability of highly efficient wireless local area networks (WLAN). Wireless networks create numerous opportunities for connectivity by allowing portable devices to connect to access points linked to the wired Internet, and by eliminating the need for costly wiring systems that would be required to link a multitude of devices to a single point.

The dominant standards for WLAN are those of the IEEE 802.11 family, also known as Wi-Fi. The latest Wi-Fi standard is called IEEE 802.11n. The standard is a significant improvement over earlier standards because it allows for the use of multiple channels. The maximum data rate depends on how much bandwidth each channel is allowed, how many channels are used, and how the data is coded. However, in applications using only one channel to send and receive—1×1 applications—the standard can achieve a maximum data rate of 150 megabits per second (Mbps). If enough resources are dedicated, and the right coding is used, the standard can achieve up to 600 Mbps. However, most applications will have data rates below 400 Mbps.

The ability to connect to a WLAN is generally provided to a host device through the addition of a wireless communication circuit. The wireless communication circuit is set to transfer data between a wireless network and the host device in accordance with a particular standard such as IEEE 802.11n. A host device could be a handset, laptop, personal data assistant, computer, portable gamming system, camera, or any other electronic device. The main element of a wireless communication circuit is the circuit's radio.

In most modern applications, the wireless communication circuit will have an integrated radio wherein each of a radio frequency processing (RF) component, a base band processing component (BB), and a media access control component (MAC) are all contained on a single integrated circuit (IC). The MAC is tasked with assuring that packets sent across a network by different stations on a wireless network do not conflict, that such packets are delivered as desired, and that the data within the packets is properly packaged in accordance with the relevant standard. The BB and the RF prepare the packaged communication data for transfer through the air. The RF modulates the signal in accordance with the relevant standard. Example modulation techniques include quadrature amplitude modulation (QAM), amplitude modulation (AM), and frequency modulation (FM).

Communication data generally needs to be transferred from the host device to the wireless communication circuit across an interface. The term interface can refer to the entire system that links the host device to the wireless communication circuit, but it can also be used to refer to the portion of either that allows the system to communicate. As such, the portion of the host device that allows it to communicate externally would be called the host interface. Interfaces need to operate according to certain generally accepted standards because they are often used to link devices that are built by separate entities. Two common examples of interface standards used for wireless communication circuits are the peripheral component interconnect express (PCIe) standard, and the secure digital input/output (SDIO) standard. As such, an interface following the SDIO standard would be called an SDIO interface. PCIe is generally used when the host device has a large power supply, while SDIO is used when the host device is portable and is constrained by a tight power budget.

The operation of a wireless communication circuit that uses a PCIe interface with its host device can best be understood with reference to FIG. 1. In FIG. 1, host device 100 contains system memory 101, and is connected to wireless communication circuit 110 through a PCIe interface comprised of host PCIe interface 102, and endpoint PCIe interface 111. Wireless communication circuit 110 additionally comprises MAC 112, BB 113, RF 114, and antenna 115.

The system displayed in FIG. 1 uses a feed-through data transfer scheme. The term feed-through is meant to refer to the fact that there is no requirement that communication data be temporarily stored on wireless communication circuit 110 before it is sent out by antenna 115. The PCIe interface is capable of running at 2.5 GHz. Therefore, data is transferred fast enough across the interface for data to be sent directly through from host device 100 to antenna 115.

PCIe is a standard that allows for bidirectional bus mastering. This means that either host device 100, or wireless communication circuit 110 can take control of bus 120, and data can flow just as easily in one direction or the other. As described above, this allows wireless communication circuit 110 to take control of the bus and easily transfer communication data between the system memory in host device 100 and through antenna 115. In addition, this allows host device 100 to take control of bus 120 and configure MAC 112, BB 113, and RF 114. Finally, bidirectional bus mastering allows MAC 112 to write data directly into system memory 101 at an internally specified address without the need for additional intelligence or storage on memory circuit 110.

Although the system using a PCIe interface has high throughput, this high speed comes at the cost of high power consumption. This may be highly undesirable for most handheld mobile devices since they run off small lithium batteries. The PCIe standard is more suitable for mobile computers which run off large battery packs and can therefore afford the power-hungry PCIe solution. Incorporating a PCIe interface would unduly shorten the amount of time between charges for a hand-held mobile device. Therefore, the PCIe approach gives good throughput performance, but it is so power hungry, that it is not a practical solution for hand-held portable devices. Moreover, the PCIe interface requires a relatively large amount of silicon area to implement. The resulting increase in manufacturing cost and increased chip size makes the PCIe interface a very unattractive candidate for use in hand-held portable, mobile applications.

The operation of a wireless communication circuit that uses an SDIO interface to communicate with its host device can best be understood with reference to FIG. 2. In FIG. 2, host device 200 contains system memory 201, and is connected to wireless communication circuit 210 through an SDIO interface comprised of master SDIO interface 202, and slave SDIO interface 211. Wireless communication circuit 210 additionally comprises MAC 212, BB 213, RF 214, and antenna 215. Also, wireless communication circuit 210 comprises internal bus 216, memory 217, and CPU 218.

The system displayed in FIG. 2 uses a store-and-forward data transfer scheme. The term store-and-forward refers to the fact that communication data that transfers between host device 200 and antenna 215 is temporarily stored in memory 217. The SDIO interface does not allow bus mastering by the client chip, so data has to be buffered on wireless communication circuit 210. The memory required for such buffering can run into the range of hundreds of kilo-bytes (kb). This memory will usually be comprised of area consuming random access memory for the communication data, as well as read only memory for CPU 218.

SDIO is a master-slave interface standard, and therefore allows only single directional bus mastering. The physical connections that connect master SDIO interface 202 and slave SDIO interface 211 comprise bus 220, and interrupt line 221. When data is transmitted by host device 200, it will use SDIO master interface 202 to write the communication data into memory 217. Then, host device 200 will inform CPU 218 that the data is ready to be transmitted. Next, CPU 218 will configure MAC 212, BB 213, and RF 214. Finally, MAC 212 will act as master of internal bus 216, will request data from memory 217, and then will send it out. When data is received, this process happens in reverse, except that CPU 218 informs host device 200 that the data is ready to be written into memory 201 by using interrupt line 221. Unfortunately, the downside to using an SDIO interface is that it does not allow bus mastering by the client wireless chip. Consequently, all wireless chips that use this interface typically require a large amount of buffer memory as well as a central processing unit (CPU) to manage this memory. The disadvantages to using an SDIO interface is that the buffer and CPU increase manufacturing costs as well as increase the overall size of the wireless chip. Therefore, neither the SDIO approach nor the PCIe approach is optimal for hand-held portable device applications.

As wireless demands continue expanding, the pressure for electronic devices to provide wireless connectivity at a faster rate, with longer battery life, and less cost will continue to grow. Inventions that contribute to improvements in the power conservation, miniaturization, and speed of wireless communication circuits are of extreme importance as they will all facilitate the potential explosion of new applications for all of society's electronic devices.

SUMMARY OF INVENTION

In one embodiment of the invention, a system for wireless communication using a host-slave interface is disclosed. The system comprises a host device with a slave interface, and a wireless communication circuit with a master interface that is coupled to the slave interface. The wireless communication circuit transfers communication data between a wireless network and the host device. Such a configuration produces a compact, low-power system for wireless communication using a host-slave interface, wherein the wireless communication circuit is the master and controls the bus.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. As a specific example, lines in block diagrams represent embodiments wherein such lines are data buses or single wires, and arrows on signal lines can indicate bus control or data flow directions. Thus, it is intended that the present subject matter covers such modifications and variations as come within the scope of the appended claims and their equivalents.

Figure 1:
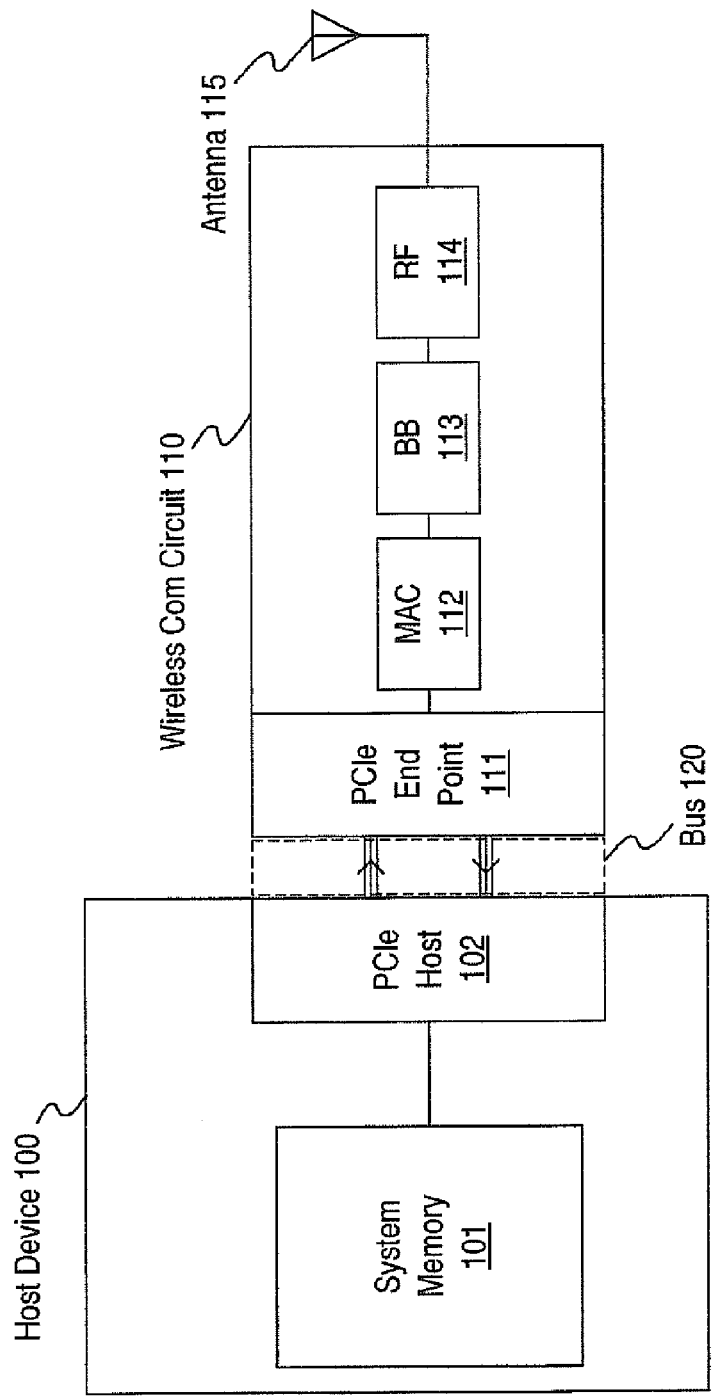
FIG. 1 illustrates a block diagram of a prior art system that uses a PCIe interface.
Figure 2:
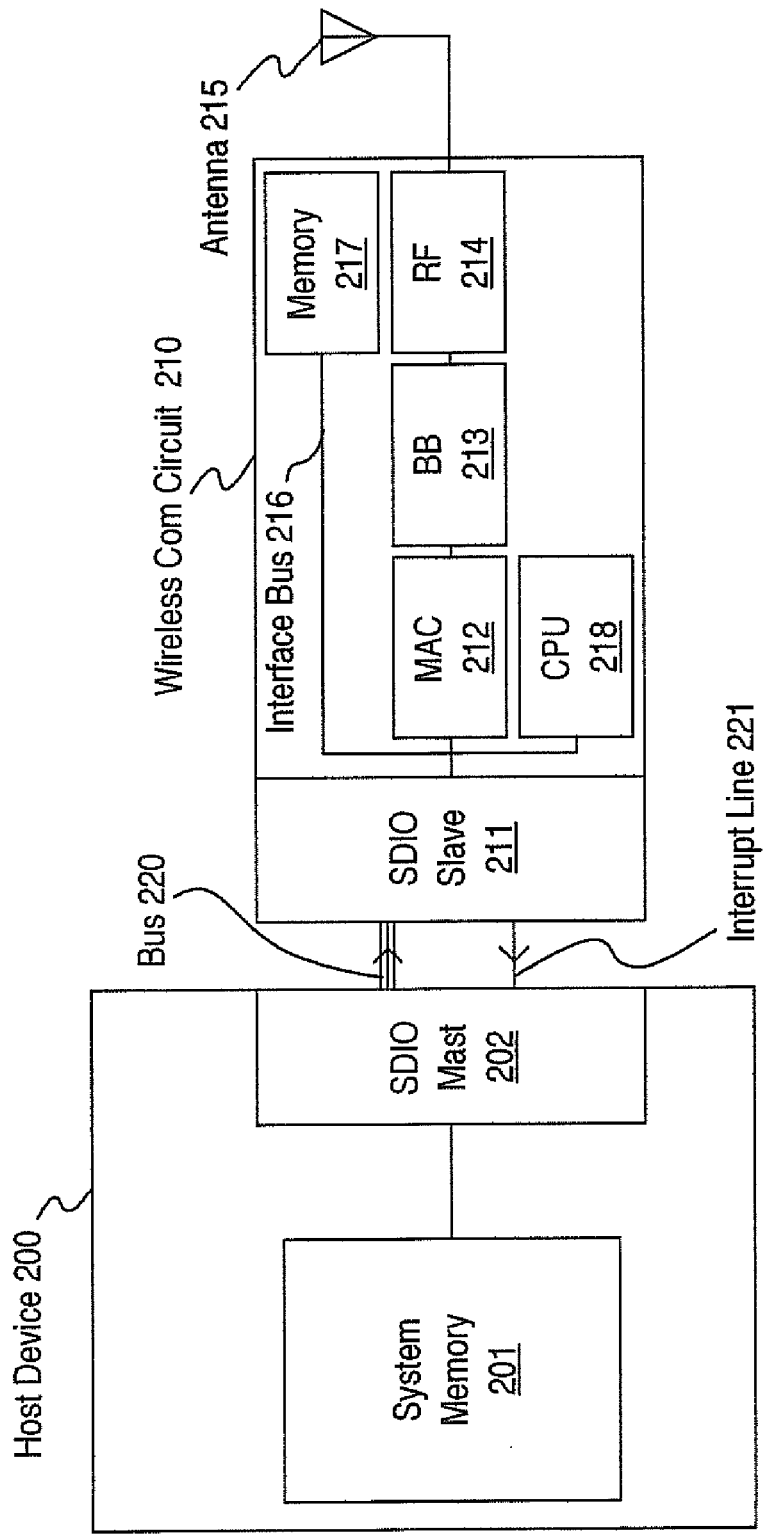
FIG. 2 illustrates a block diagram of a prior art system that uses an SDIO interface.

A particular embodiment of the present invention combines the low power consumption and pin count of the SDIO approach with the PCIe approach's lack of an internal memory. The system uses an SDIO interface similar to the system in FIG. 2, but places the SDIO master interface on the wireless communication circuit, and places the SDIO slave interface on the host device. In this particular embodiment, the wireless communication circuit is able to transfer bulk communication data to the host device without needing a CPU or its own memory circuit.

Figure 3:
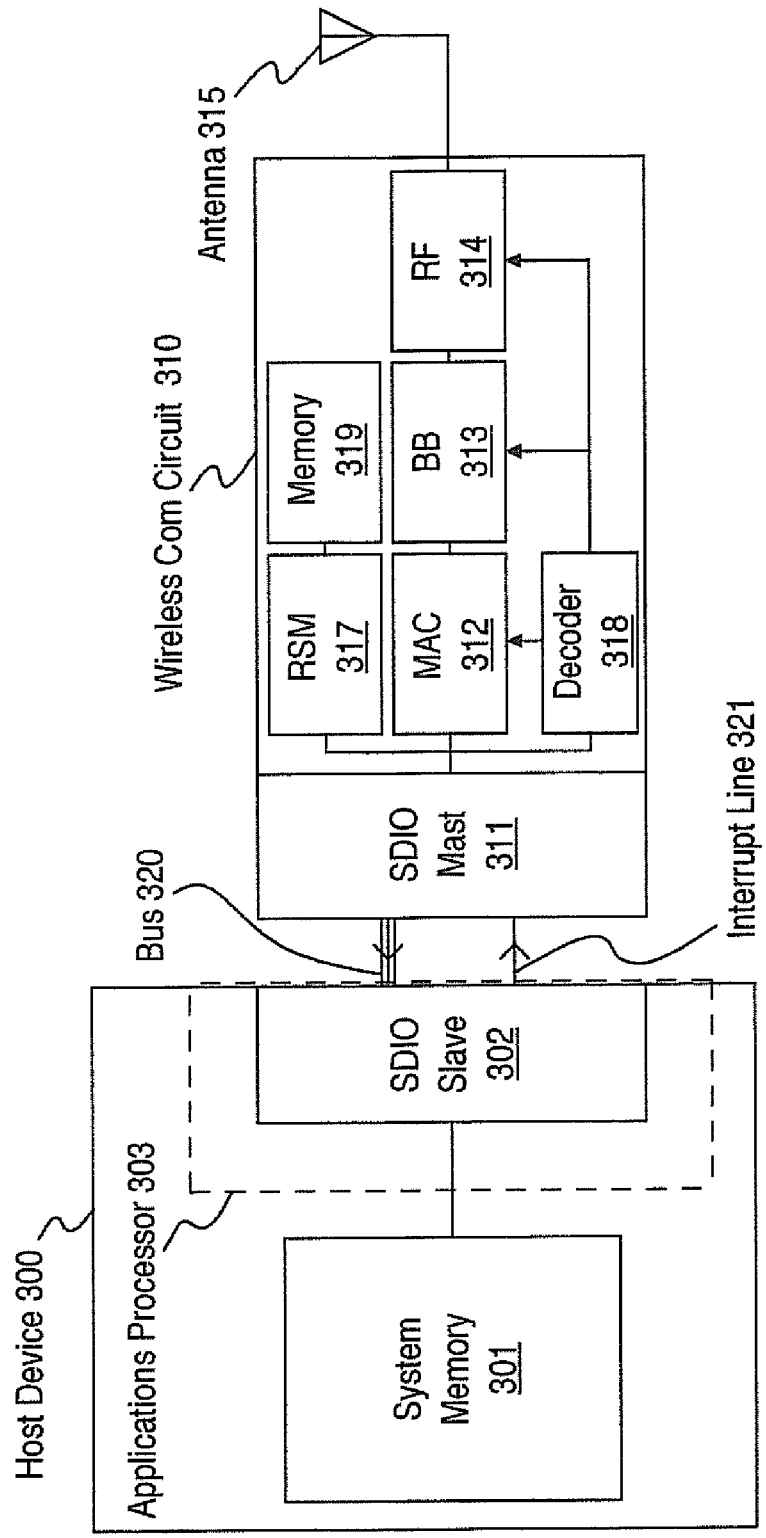
FIG. 3 illustrates a block diagram of a system using an SDIO interface and a register state machine (RSM) that is in accordance with the present invention.

The embodiment described above can be understood with reference to FIG. 3. In FIG. 3, host device 300 contains system memory 301. In contrast with the prior art, host device 300 additionally comprises SDIO slave 302. Note that applications processor 303 is displayed to show that generally system memory 301 is a separate portion of host device 300. The system in FIG. 3 also contrasts with the prior art in that wireless communication circuit 310 is linked to host device 300 through SDIO master interface 311. Since wireless communications circuit 310 is the bus master, bulk communication data can flow directly between MAC 312 and system memory 301.

Once MAC 312 has been configured to know where received data should be written in system memory 301, and where data needing to be transmitted is present in system memory 301, controlling the SDIO bus allows the MAC to execute such tasks rapidly such that buffering communication data on wireless communication circuit 310 is not necessary. Since buffering is not required, the radio formed by MAC 312, BB 313, and RF 314 can transmit information immediately between antenna 315 and system memory 301.

A system in accordance with FIG. 3 is expected to be a significant improvement over the prior art. The SDIO interface would only require 5-10 mA and would have a low pin count of 6 pins. In addition, it is estimated that the elimination of the memory and CPU from the wireless communication circuit would produce a size savings of roughly 20% which would result in a commensurate decrease in the system's production cost. Finally, the resultant wireless communication circuit would have adequate throughput for most modern applications. The SDIO 2.0 standard allows for 200 Mbps of throughput which, as mentioned previously, is adequate for all 1×1 802.11n applications. In addition, the recently released SDIO 3.0 standard would allow for 400 Mbps of throughput which would be adequate for nearly all 802.11 applications.

A system in accordance with FIG. 3 is able to transfer bulk communication data easily between MAC 312 and system memory 301. However, since the host device is now the slave, it is difficult for the device to communicate back to the wireless communication circuit in order to configure the radio. Two approaches in accordance with embodiments of the present invention that could enable the host device to configure the radio are described as follows. A first approach is to provide a system on the wireless communication circuit that is capable of configuring the radio when triggered by an interrupt signal from the host device. A second approach is to provide a simple auxiliary serial interface that connects the host device to the wireless communication circuit. The host device would then be able to configure the radio on the wireless communication circuit through this simple auxiliary interface.

The first approach mentioned above can be understood with reference again to FIG. 3. The system in FIG. 3 additionally comprises register state machine (RSM) 317, decoder 318, and memory 319. Memory 319 in FIG. 3 is much smaller than memory 217 in FIG. 2. Memory 319 is static memory which contains the initial location which RSM 317 should read data from, or write data to, in system memory 301. As such, memory 319 could be implemented using one time programmable (OTP) memory which would be programmed when a wireless communication circuit 310 was ready to be deployed for use with a specific host device 300.

Host device 300 will configure the radio on wireless communication circuit 310 by first sending an interrupt signal through the SDIO interface. Note that although the SDIO interface is mainly comprised of bus 320 for the transmission of bulk communication data, and it is controlled by wireless communication circuit 310, interrupt line 321 is also part of the interface and is controlled by host device 300. The interrupt signal sent by host device 300 will travel along interrupt line 321 and will trigger RSM 317 to configure the radio. RSM 317 will call up configuration data in the form of instructions from system memory 301 across data bus 320. Decoder 318 will take in these instructions and configure MAC 312, BB 313, and RF 314. Although this interrupt process will slow down the overall throughput of the system, in some embodiments the interrupt signal will only be required once each time a frame of communication data is transferred.

The second approach mentioned above can be understood with reference to FIG. 4. The system in FIG. 4 contains many of the same elements as the system in FIG. 3. Host device 400 contains system memory 401, applications processor 403, and SDIO slave interface 402. Wireless communications circuit 410 is connected to host device 400 through SDIO master interface 411. Wireless communications adapter 410 is comprised mainly of MAC 412, BB 413, and RF 414. Communications data is transferred between wireless communications circuit 410 and the wireless network through antenna 415.

Figure 4:
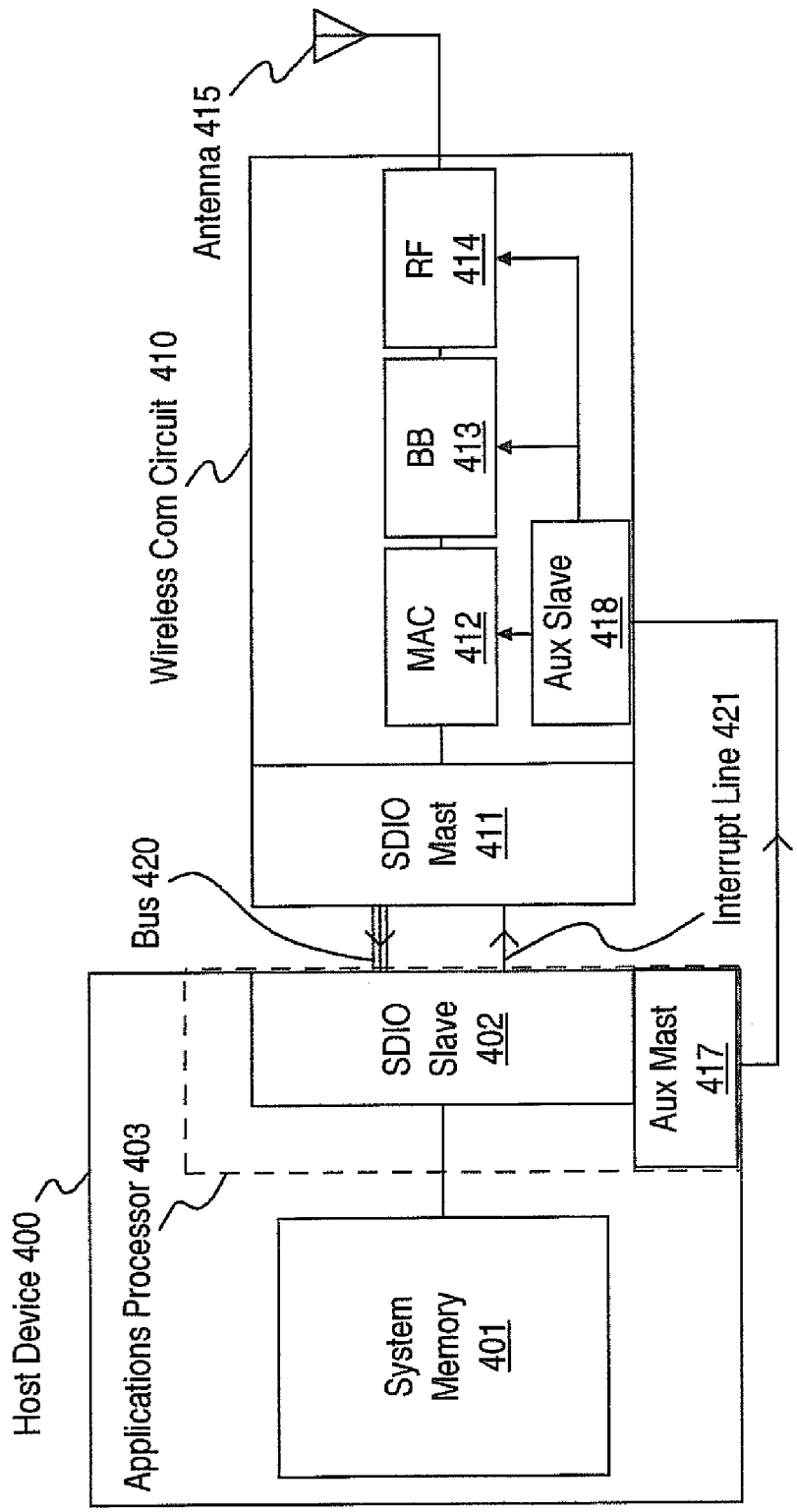
FIG. 4 illustrates a block diagram of a system using an SDIO interface and a simple auxiliary serial interface that is in accordance with the present invention.

The main difference between the systems in FIGS. 3 and 4 is the addition of simple auxiliary serial interface master 417 on host device 400. The simple auxiliary serial interface master 417 links with the corresponding slave component of the interface 418 on wireless communication circuit 410. This additional interface is controlled by host device 400 and allows register access on wireless communication circuit 410 so that host device 400 is able to configure the radio on wireless communication circuit 410. Bulk communication data is still transferred along bus 420. Simple serial interfaces such as inter-integrated circuit ($I^2C$) or universal asynchronous receiver/transmitter (UART) require only 2 additional pins, and are very low power so the addition of one of these interfaces will still result in a net improvement in power consumption, and will maintain a relatively low pin count of 8 as compared to 12 for PCIe.

There are several methods for managing a wireless communication circuit bus in a wireless system that are in accordance with the present invention. The several methods share the characteristic steps of engaging a master interface on a wireless communication circuit with a slave interface on a host device, and transferring communication data across the wireless communication circuit between a wireless network and the host device. Two particular methods that are in accordance with the present invention are displayed in FIGS. 5 and 6.

Figure 5:
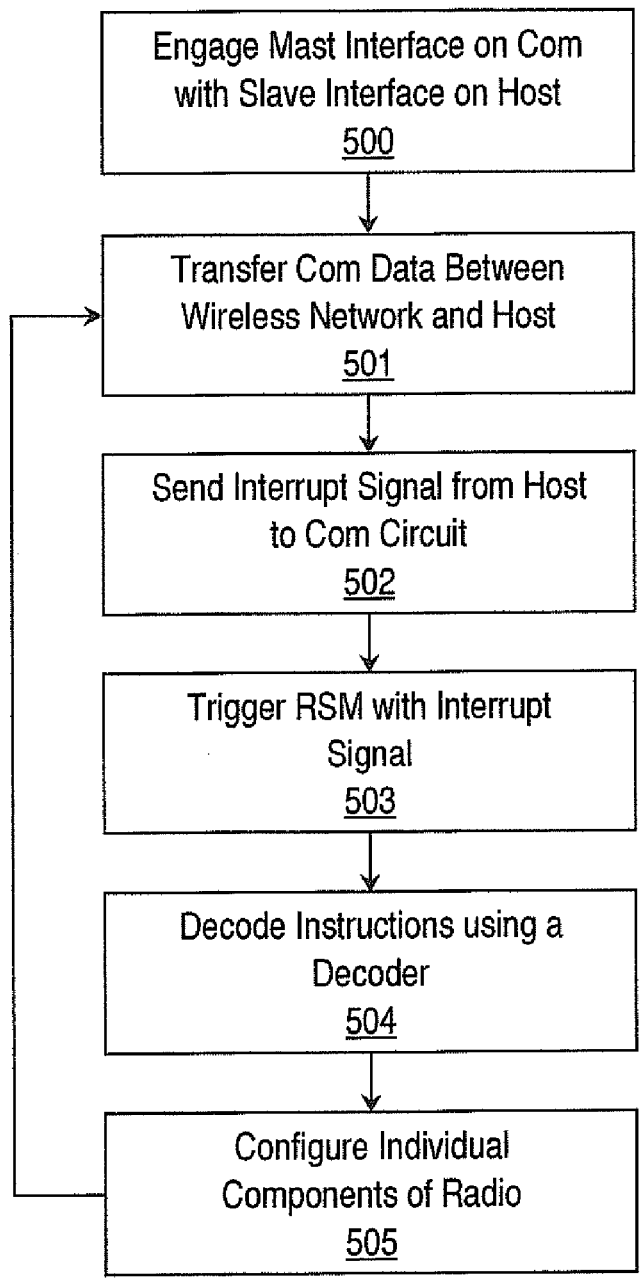
FIG. 5 illustrates a flow chart of a method for managing a wireless communication circuit bus in a wireless communication system using an RSM that is in accordance with the present invention.

A method for managing a wireless communication circuit bus in a wireless communication system which utilizes the interface slave's capability to send an interrupt signal that is in accordance with the present invention can best be understood with reference to FIG. 5. In step 500, an interface master on a wireless communication circuit is engaged with an interface slave on a host device. Next, in step 501, communication data is transferred across the wireless communication circuit between a wireless network and the host device. This transferring could be done by a radio, which could be an integrated radio. Step 501 will continue to execute until an interrupt signal is sent from the host device to the wireless communication circuit in step 502. This signal will be sent using the interface slave on the host device. In step 503, a register state machine located on the wireless communication circuit is triggered upon receipt of the interrupt signal from the host device. In step 504, a decoder located within the wireless communication circuit decodes instructions received through action of the RSM. In step 505, the instructions are used to configure the individual components of a radio. The radio processes data received through the interface master for transmission to the wireless network, and also processes data received from the wireless network. After the radio is configured, the system can return to step 501.

A particular embodiment of the invention would follow all of the steps in FIG. 5, but would also have the additional step of hard-coding an initial address for a segment of configuration data from the system memory block into a static memory on the wireless communication circuit. In such an embodiment, the triggering of the RSM would cause the RSM to call up a segment of configuration data from the system memory block at the hard-coded initial address. In some embodiments of the present invention, the hard-coding would be done using OTP memory.

Figure 6:
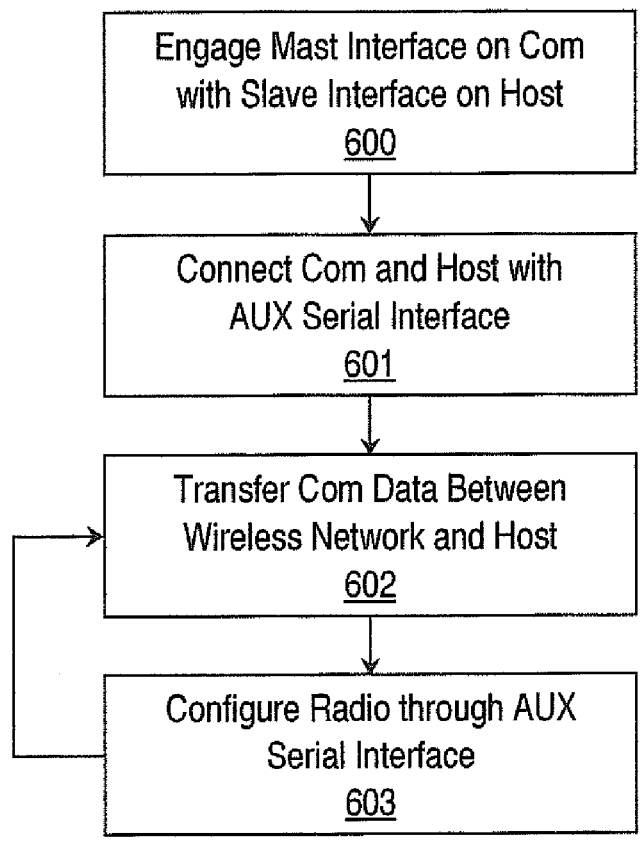
FIG. 6 illustrates a flow chart of a method for managing a wireless communication circuit bus in a wireless communication system using a simple auxiliary serial interface that is in accordance with the present invention.

Another method for managing a wireless communication circuit bus in a wireless communication system which utilizes a simple auxiliary serial interface to configure the radio of the wireless communication system that is in accordance with the present invention can best be understood with reference to FIG. 6. In step 600, an interface master on a wireless communication circuit is engaged with an interface slave on a host device. In step 601, a simple auxiliary serial interface connects the host device to the wireless communication circuit. Next, in step 602, communication data is transferred across the wireless communication circuit between a wireless network and the host device. This transferring could be done by a radio, which could be an integrated radio. In step 603, the radio within the wireless communication circuit is configured by the host device through the simple auxiliary serial interface. After the radio has been configured, the system will return to step 602.

Although embodiments of the invention have been discussed primarily with respect to specific embodiments thereof, other variations are possible. Various configurations of the described system may be used in place of, or in addition to, the configurations presented herein. For example, although the wireless communication circuit was discussed as if it was on a separate substrate from the host device, the two could be integrated into the same chip or have any other spatial-architectural relationship, so long as an interface was necessary for their communication. In addition, the wireless communication circuit does not need to be a single system on a chip, because the individual components may be on separate substrates. Also, the radio could be an integrated radio. Also, the invention is not limited to use with an SDIO interface as a serial peripheral interface or some other related interface standard could be applied in its stead. Likewise, the invention is not limited to use with a simple auxiliary serial interface standard using I$^2$C, because a recommended standard 232, universal asynchronous receiver/transmitter (UART), or any other serial interface standard could be applied in its stead.

Those skilled in the art will appreciate that the foregoing description is by way of example only, and is not intended to limit the invention. Nothing in the disclosure should indicate that the invention is limited to systems that communicate through the use of charged particles, or systems that rely mainly on silicon. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any related to intersystem communication and any present or future protocol.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system for wireless communication using a host-slave interface comprising:
    a bus;
    a host device including a slave interface coupled to the bus; and
    a wireless communication circuit coupled to said bus, said wireless communication circuit including a master interface that controls said bus, wherein said wireless communication circuit transfers communication data received from said slave interface of said host device on said bus to a wireless network, and wherein said wireless communication circuit transfers data received from said wireless network to said slave interface of said host device on said bus.

2. The system of claim 1, wherein said slave interface and said master interface comprise a serial peripheral interface standard and a secure digital input/output interface standard.

3. The system of claim 1, wherein said wireless communication circuit transfers said communication data using an integrated radio.

4. The system of claim 1, wherein said host device comprises:
    a system memory block;
    an applications processor, wherein said wireless communication circuit can access data stored in said system memory block through said master interface.

5. The system of claim 4, wherein said wireless communication circuit comprises:
    a radio processing data received through said master interface for transmission to said wireless network, and data received from said wireless network;
    a register state machine;
    a decoder configuring a set of individual components of said radio based on instructions obtained through the action of said register state machine, wherein said register state machine is triggered by an interrupt signal received through said master interface from said host device.

6. The system of claim 5, wherein said set of individual components comprises a media access control component, a base band processing component, and a radio frequency processing component.

7. The system of claim 5, wherein said register state machine calls up a segment of configuration data from said system memory block when triggered and an initial address for said segment is hard-coded on said wireless communication circuit in a static memory.

8. The system of claim 7, wherein said static memory is one time programmable memory.

9. The system of claim 4, wherein said wireless communication circuit is coupled to said host device through a simple auxiliary serial interface and said simple auxiliary serial interface allows said host device to configure a radio on said wireless communication circuit.

10. The system of claim 9, wherein said simple auxiliary serial interface comprises a universal asynchronous receiver/transmitter interface standard.

11. A method for managing a wireless communication circuit bus in a wireless communication system comprising the steps of:
    controlling a bus by a master interface on a wireless communication circuit, wherein said bus is coupled with a slave interface on a host device;
    transferring communication data across said wireless communication circuit, wherein said wireless communication circuit transfers communication data received from said slave interface of said host device on said bus to a wireless network, and wherein said wireless communication circuit transfers data received from said wireless network to said slave interface of said host device on said bus.

12. The method of claim 11, wherein said slave interface and said master interface follow one of a serial peripheral interface standard, and a secure digital input/output interface standard.

13. The method of claim 11, wherein said transferring communication data is accomplished by an integrated radio.

14. The method of claim 11, wherein said data is stored in a system memory block and said host device includes an applications processor that is separate from said system memory block.

15. The method from claim 14, further comprising the steps of:
- sending an interrupt signal from said host device to said wireless communication circuit using said slave interface;
- triggering a register state machine located on said wireless communication circuit using said interrupt signal;
- decoding instructions received through the action of said register state machine using a decoder; and
- configuring a set of individual components of a radio based on said instructions;
- wherein said radio processes data received through said master interface for transmission to said wireless network and data received from said wireless network.

16. The method of claim 15, wherein said set of individual components comprises a media access control component, a base band processing component, and a radio frequency processing component.

17. The method of claim 15, further comprising the step of:
- hard-coding an initial address for a segment of configuration data from said system memory block into a static memory on said wireless communication circuit, wherein said triggering causes said register state machine to call up a segment of configuration data from said system memory block at said initial address.

18. The method of claim 17, wherein said hard-coding is performed using one time programmable memory for said static memory.

19. The method of claim 14, further comprising the steps of:
- coupling said wireless communication circuit to said host device through a simple auxiliary serial interface; and
- configuring a radio on said wireless communication circuit through said simple auxiliary serial interface.

20. The method of claim 19, wherein said simple auxiliary serial interface follows one of an inter-integrated circuit, a recommended standard 232, or a universal asynchronous receiver/transmitter interface standard.

\* \* \* \* \*